United States Patent
Shimizu et al.

(10) Patent No.: US 8,758,846 B2
(45) Date of Patent: Jun. 24, 2014

(54) DAIRY PRODUCT AND METHOD FOR PRODUCING THE SAME

(75) Inventors: Kazuya Shimizu, Takatsuki (JP); Hajime Kashiwai, Takatsuki (JP); Kazuo Sagiya, Sumida-ku (JP); Kazuhiko Kizaki, Sumida-ku (JP)

(73) Assignee: UCC Ueshima Coffee Co., Ltd., Hyogo (JP)

( * ) Notice: Subject to any disclaimer, the term of this patent is extended or adjusted under 35 U.S.C. 154(b) by 763 days.

(21) Appl. No.: 12/095,457

(22) PCT Filed: Aug. 30, 2007

(86) PCT No.: PCT/JP2007/066913
§ 371 (c)(1),
(2), (4) Date: May 29, 2008

(87) PCT Pub. No.: WO2008/047513
PCT Pub. Date: Apr. 24, 2008

(65) Prior Publication Data
US 2010/0003395 A1    Jan. 7, 2010

(30) Foreign Application Priority Data

Oct. 20, 2006  (JP) ................................. 2006-286378

(51) Int. Cl.
*A23C 9/152* (2006.01)
(52) U.S. Cl.
USPC ...................................................... 426/580
(58) Field of Classification Search
USPC ...................................................... 426/580
See application file for complete search history.

(56) References Cited

U.S. PATENT DOCUMENTS

| 3,935,325 | A | 1/1976 | Gilmore et al. |
| 7,083,821 | B1 | 8/2006 | Parmenter |

FOREIGN PATENT DOCUMENTS

| EP | 0 788 744 A1 | 8/1997 |
| GB | 2 381 731 A | 5/2003 |
| JP | 52-79060 A | 7/1977 |
| JP | 6-90663 A | 4/1994 |
| JP | 9-187242 A | 7/1997 |
| JP | 11-9214 A | 1/1999 |
| JP | 2001-69910 A | 3/2001 |
| JP | 2002-223697 A | 8/2002 |

OTHER PUBLICATIONS

JPO Machine Translation of JP Application No. 2002-223697, published Aug. 13, 2002 to Shimada, Toshihiro et al. p. 1-9.*
Knehr, Elaine. "Carbohydrate Sweeteners". May 2005 Supplement. Retrieved online from www.foodproductdesign.com. pp. 1-5.*
"Very Dairy Day". Available online Apr. 1, 2006. Retrieved online from Preparedfoodsnetwork.com. pp. 1-3.*
Japanese Office Action dated Jan. 20, 2010, issued in Japanese Patent Application No. 2007-224226.

* cited by examiner

*Primary Examiner* — D. Lawrence Tarazano
*Assistant Examiner* — Jenna A Watts
(74) *Attorney, Agent, or Firm* — Sughrue Mion, PLLC

(57) ABSTRACT

The present invention provides a dairy product which endures cryopreservation for a long period, and also has viscosity suited for use in a dispenser for beverage. An emulsified composition containing a milk fat content, a milk protein content, a disaccharide alcohol and an emulsifier in a certain ratio is prepared. A ratio of each component of the emulsified composition can be obtained by accurately adjusting the amounts of raw materials such as milk, whole milk powders, butter, cheese, cream, condensed milk, butter oil, butter milk and butter milk powders serving as a milk fat source and a milk protein source; a disaccharide alcohol; an emulsifier; and moisture.

6 Claims, No Drawings

DAIRY PRODUCT AND METHOD FOR PRODUCING THE SAME

TECHNICAL FIELD

The present invention relates to a dairy product and a method for producing the same. More particularly, the present invention relates to a liquid dairy product which has viscosity suited for use in a dispenser for beverage and does not cause deterioration of flavor even when thawed after cryopreservation, and also causes neither solidification nor separation of a specific component, and to a method for producing the same.

BACKGROUND ART

In beverages such as coffee, tea and cocoa being served by a dispenser for beverage, a dairy product such as an emulsified liquid composition is used as a whitener, or as a milk component of cafe au lait or cocoa. Such a dairy product is stored separately from components such as a stock solution of coffee, tea and cocoa and a sugar stock solution within a dispenser. Immediately before drinking, the dairy product is at first ejected through a nozzle so as to dilute it with cold water or warm water, and then served to a drinking cup together with a component such as coffee or a sugar component being dispensed separately, or directly served into the drinking cup, and then diluted and mixed with a main component such as coffee in the cup.

In order to serve a beverage having a certain flavor, operations such as ejection, dilution and dispensation, or operations of ejection and dispensation in the dispenser are required to be accurate. When a stock solution in the dispenser has high viscosity and the stock solution itself causes component separation, a certain constant dispersing volume cannot be attained. Furthermore, a beverage containing contents with separation or solidification, gives consumers concern about perishability and unpleasantness. Therefore, it is necessary that a dairy product such as an emulsified liquid composition has a property of giving a preferable taste upon ejection from an inside of a dispenser to beverages such as coffee, tea and cocoa through a proper concentration and components. Moreover, it is also necessary that a dairy product has proper low level of viscosity so as to maintain a stable amount of the dairy product to be ejected from the dispenser.

On the other hand, in view of storage stability, a dairy product is preferably a product which maintains stable quality until it is supplied to the dispenser even when stored for a long period. An emulsified liquid composition currently used is mainly an oil-in-water type emulsion, and is usually prepared by mixing a milk fat, a milk protein or a component analogous thereto, an emulsifier and a flavor, followed by homogenization. However, these components may be easily solidified during storage, or may cause separation of the fat or protein when being used after storage.

In order to distribute a dairy product or a whitener used as a milk component for coffee, tea and cocoa, at an ambient temperature, it is necessary to be formed into such as evaporated milk or condensed milk having high concentration of constituent components and to control microorganisms thoroughly such as by heat sterilization, utilization of principle of sugar preservation or a use of an impermeable sealed container. However, in the evaporated milk or condensed milk obtained by subjecting to a heat treatment or increasing a sugar content, heat deterioration may occur depending on the conditions, and sweetness generates as a result of adding sugar, and thus quality and flavor may vary and also viscosity increases. For example, when retort heating is carried out at a high temperature of 115° C. for about 15 to 20 minutes, heat deterioration is caused by an aminocarbonyl reaction between the sugar and the milk component, and by an influence of the residual oxygen immediately after a sterile production. Furthermore, after storage at an ambient temperature, browning reaction proceeds and also flavor deteriorates. Such a composition having high viscosity is not suited for use in a conventional dispenser since it is very difficult or impossible to eject the composition from the inside of the dispenser when used in the dispenser.

Storage at low temperature is useful means for storage for a long period. Particularly, when heat sterilization and principle of sugar preservation cannot be utilized, cryopreservation is a useful means, which enables storage for a longer period, as compared with chilled storage. However, problems of solidification of the emulsified liquid composition composed mainly of milk during storage, and separation of the fat or protein caused by the use after storage become more markedly during the process of freezing and the following thawing. Namely, an emulsified state, which was uniform at an initial stage, is deteriorated by freezing and, when thawed and diluted, the state turns into a non-uniform state or separation of the milk component arises. In addition, since chilled storage is carried out at a low temperature of 2 to 6° C. for a certain period of time in the dispenser at any rate, viscosity may tend to increase in the mean time.

Japanese Unexamined Patent Publication No. 2001-69910 discloses, as a method for improving quality stability after freezing and thawing of a coffee whitener, a method of adding to an oil phase as an emulsifier, a polyglycerin fatty acid ester, which contains behenic acid as a main constituent fatty acid and has an esterification degree of 50% or more.

Patent Document 1: Japanese Unexamined Patent Publication No. 2001-69910

DISCLOSURE OF THE INVENTION

Problems to be Solved by the Invention

Conventionally, there has never been provided a dairy product, which maintains proper viscosity and flavor suited for use in a dispenser, and causes no emulsion deterioration even after subjecting to a freezing and thawing treatment, and is also suited for use as a whitener or a milk component while maintaining a homogeneous state. Therefore, it has been required to develop such a dairy product.

Means for Solving the Problems

The present inventors have intensively studied so as to prepare an emulsified composition which can maintain an excellent condition even after subjecting to a freezing and thawing treatment, and found a dairy product, which maintains proper viscosity and flavor suited for use in a dispenser, and causes no emulsion deterioration even after subjecting to a freezing and thawing treatment, and also endure storage for a long period while maintaining a homogeneous state. Thus, the present invention has been completed.

Namely, the dairy product of the present invention contains 5.5 to 14.5% by weight of a milk fat content, 2.5 to 7.5% by weight of a milk protein, 2.5 to 14% by weight of a disaccharide alcohol and 0.1 to 2% by weight of an emulsifier, and has viscosity of 200 cP or less.

In one aspect of the present invention, the disaccharide alcohol as a constituent component of the dairy product is one or a combination of two or more selected from the group consisting of maltitol, lactitol and palatinit.

The dairy product of the present invention has freezing endurance.

The method for producing the dairy product of the present invention includes the steps of mixing 5.5 to 14.5% by weight of a milk fat content, 2.5 to 7.5% by weight of a milk protein, 2.5 to 14% by weight of a disaccharide alcohol and 0.1 to 2% by weight of an emulsifier, and homogenizing the resultant mixture.

Effects of the Invention

The dairy product of the present invention is free from solidification, or separation of the fat or protein caused by the use after storage while maintaining proper viscosity and flavor. Particularly, the present dairy product has both characteristics of low viscosity and free from emulsion deterioration after a freezing and thawing treatment, which are hardly compatible with each other, with good balance, and is therefore suited for storage for a long period and is suited for use in a dispenser.

BEST MODE FOR CARRYING OUT THE INVENTION

The present invention will be described in detail below. The dairy product of the present invention is prepared as a homogeneous composition containing water, a milk component, a disaccharide alcohol and an emulsifier in an appropriate amount, and has freezing and thawing endurance since each content of a fat component, a protein component, a disaccharide alcohol component and an emulsifier component is within a specific range.

As used herein, "freezing" of a dairy product means that the dairy product is allowed to stand at a temperature range of about −5° C. or lower and −50° C. or higher for at least one hour, usually one or more hours. In addition, "thawing" means a treatment in which entire moisture in a frozen state in the dairy product returns to a liquid state.

As used herein, "freezing endurance" means that, when an object is thawed after freezing, neither solidification nor separation of components is observed and a homogeneous and excellent condition is maintained.

As used herein, "viscosity" means the measurement results by a B type viscometer (manufactured by TOKI SANGYO CO., LTD.) using a rotor No. 2 under the conditions of 60 rpm and at a temperature of 5+1° C. Viscosity of the dairy product of the present invention is 200 cP or less. Therefore, the dairy product of the present invention is in the form of a liquid composition.

The amount of the milk fat contained in the dairy product of the present invention is preferably from 5.5 to 14.5% by weight, and more preferably from 6 to 12% by weight, based on % by weight of the entire dairy product. As an origin of the milk fat, milk and a milk-containing product are used. Examples of the milk and milk-containing products include, but are not limited to, such as milk, whole milk powder, butter, cheese, cream, condensed milk, butter oil, butter milk and butter milk powder, and these are used alone or in combination appropriately.

As long as the milk fat is contained, any material can be used. As used herein, "milk fat content" is a value obtained by the Roese-Gottlieb method.

The amount of the milk protein contained in the dairy product of the present invention is preferably from 2.5 to 7.5% by weight, and more preferably from 3 to 6% by weight, based on % by weight of the entire dairy product. As an origin of the milk protein, milk and a milk-containing product are used. The milk and milk-containing products are not particularly limited and examples thereof include, but are not limited to, such as milk, whole milk powder, skim milk powder, butter, cheese, cream, condensed milk, butter milk and butter milk powder, and these are used alone or in combination appropriately. As used herein, "milk protein content" is a value obtained by the Kjeldahl method. Viscosity of the present dairy product can be adjusted to some extent according to the kind of proteins used.

An emulsifier is not specifically limited, and any emulsifier used usually in foods is appropriately used. For example, it is possible to use emulsifiers for an oil phase, such as lecithin, a glycerin fatty acid monoester and an organic acid monoglyceride; and emulsifiers for an aqueous phase, such as a sucrose fatty acid ester and a polyglycerin fatty acid ester alone or in combination. The content of the emulsifier is set within a range from 0.1 to 2% by weight.

As a disaccharide alcohol, one or a combination of two or more selected from the group consisting of maltitol, lactitol and palatinit (reduced palatinose) can be used, but it is not limited to them. When such disaccharide alcohol is used alone or in combination, the total amount thereof is from 2.5 to 14% by weight, and preferably from 3 to 14% by weight, based on % by weight of the entire dairy product.

The remaining component of the dairy product of the present invention is moisture and also can contain a trace components. Examples of the trace components include, but are not limited to, flavoring agents and salts for adding flavor, stabilizers for enhancing stability, and antioxidants, as long as it is a trace component which can be contained in general foods.

The dairy product of the present invention can be produced by homogenizing the above components in accordance with a conventional method. For example, the dairy product can be produced by adding a disaccharide alcohol, water and an emulsifier to raw materials of milk, whole milk powder, skim milk powder, butter, cheese, cream, condensed milk, butter milk and butter milk powder, each containing a milk fat content and a milk protein, either alone or in combination, heating to a proper temperature, mixing them with stirring, and subjecting the resultant mixture to a conventional homogenization step.

Alternatively, the dairy product can be produced by introducing aqueous components such as a skim milk powder, an emulsifier and a stabilizer into warm water, adding such as a component containing a milk fat content to the warm water while heating under stirring, stirring while maintaining at a temperature which is slightly higher than room temperature, and adding a disaccharide alcohol to the mixture, followed by homogenization. The production steps are not specifically limited.

In the process of producing the dairy product of the present invention, a heat treatment step for sterilization can be appropriately additionally carried out. The conditions of the heat treatment step are not specifically limited, and the temperature and the time are controlled so as to suppress growth of microorganisms during storage without causing denaturation of the milk protein or change in quality of other components. The dairy product of the present invention is very advantageous since it can be subjected to cryopreservation and does not require a severe condition in a heat treatment which can cause change in quality of components.

Examples, which specifically illustrate the constitution and effects of the present invention, will be described below. The present invention, however, is not limited to the following examples.

Example 1

Preparation of Sample

Mother water with a temperature in a range from 50 to 60° C. was mixed with a skim milk powder, sodium caseinate as a stabilizer, a sugar ester and a glycerin fatty acid ester as two kinds of emulsifiers, and metaphosphoric acid, and then these components were dissolved with stirring in a juicer mixer (manufactured by SANYO Electric Co., Ltd.). The resultant mixture was completely dissolved by heating to a temperature from 60 to 70° C. and maintaining for 5 minutes.

The completely dissolved mixture thus obtained was mixed with additional mother water, frozen cream cheese (FAST FREEZE AUSTRALIA), vitamin E, a flavoring agent, and "Milk Taste" (manufactured by KANTOUSHOKUKEN CO., LTD.).

Finally, maltitol, lactitol and a salt were added to the mixture, followed by homogenization while mixing with the use of a disperser (manufactured by OMNI INTERNATIONAL). Each amount of raw material used is as follows:
50% by weight of mother water; 12% by weight of a skim milk powder; 1% by weight of a stabilizer; an emulsifier of 0.8% by weight of a sugar ester and 0.4% by weight of a glycerin fatty acid ester; 0.1% by weight of metaphosphoric acid; 8.24% by weight of additional mother water; 20% by weight of frozen cream cheese; 0.01% by weight of vitamin E; 0.2% by weight of a flavoring agent; 0.2% by weight of Milk Taste; 3.75% by weight of maltitol; 3.0% by weight of lactitol; and 0.3% by weight of a salt. The sample obtained finally contains 11.5% by weight of a fat content, 6.1% by weight of a protein and 6.75% by weight of a disaccharide alcohol.

A sample No. 2 was prepared by the same process, except that the disaccharide alcohol was replaced by a conventional sugar (sucrose). The amounts (% by weight) of components contained in the sample No. 2 are the same as those in the sample No. 1.

Example 2

Evaluation of Quality of Compositions of Samples Nos. 1 and 2

With respect to the resultant samples Nos. 1 and 2, qualities of items (1) freezing endurance, (2) viscosity and (3) taste were evaluated. Each quality was evaluated by the following procedures.

(1) Freezing endurance was evaluated as follows. 180 ml of the resultant dairy product sample was introduced into a 200 ml sterilized cup and then frozen at −20° C. for 72 hours. After thawing at 5° C. over 24 hours, a state of solidification and component separation was evaluated by visual observation of appearance.

(2) Viscosity was measured by a B type viscometer using a rotor No. 2 under the conditions of 60 rpm and a temperature of 5±1° C. after collecting 150 ml of a dairy product sample.

(3) Taste was evaluated by drinking after diluting the sample with water at a ratio of 1:2.6. The moisture content of each sample was also measured. The moisture content was determined from a change in the weight before and after treating the sample at 99° C. for 4 hours using a pressurized heat-drying method.

The quality evaluation results of samples Nos. 1 and 2 are shown in Table 1 below. In Table 1, symbols ◯, Δ and x denote "Good", "Slightly Poor" and "Poor", respectively.

TABLE 1

| Sample No. | Composition of sample | Test results | | | |
| --- | --- | --- | --- | --- | --- |
| | | Freezing endurance | Viscosity (Cp) | Moisture content (% by weight) | Taste |
| 1 | described in Example 1 | ◯ | 117.5 | 66.1 | ◯ |
| 2 | 6.75% by weight of conventional sugar is added | ◯ | 122.5 | 66.1 | X Sweet |

Example 3

Samples Nos. 3 to 15 were prepared by the same process and the same amounts of components as those in Example 1, except that the milk fat content was changed. Qualities of these samples were evaluated in the same manner as in Example 2. The results are shown in Table 2. Regarding samples Nos. 13, 14 and 15, since viscosity increased, a rotor No. 2 at 30 rpm, a rotor No. 2 at 12 rpm and a rotor No. 3 at 30 rpm were respectively used in place of the rotor No. 2 at 60 rpm.

TABLE 2

| Sample No. | Test contents | Freezing endurance *1 | Viscosity (Cp) *2 | Moisture content (%) | Taste/ Sweetness *3 | Brix | pH |
|---|---|---|---|---|---|---|---|
| No. 3 | The same amount (as in Ex. 1) of disaccharide alcohol is added/the milk fat content is 0% (reduced maltose + lactose) *4 | X | 17.5 | 78.93 | X No milky taste | 22.65 | 6.33 |
| No. 4 | The same amount of disaccharide alcohol is added/the milk fat content is 2% (reduced maltose + lactose) *4 | X | 32.5 | 76.52 | X No milky taste | 23.50 | 6.34 |
| No. 5 | The same amount of disaccharide alcohol is added/the milk fat content is 4% (reduced maltose + lactose) *4 | X | 52.5 | 74.13 | ○ | 23.80 | 6.34 |
| No. 6 | The same amount of disaccharide alcohol is added/the milk fat content is 6% (reduced maltose + lactose) *4 | ○ | 70.0 | 71.91 | ○ | 25.52 | 6.32 |
| No. 7 | The same amount of disaccharide alcohol is added/the milk fat content is 8% (reduced maltose + lactose) *4 | ○ | 95.0 | 69.41 | ○ | 26.78 | 6.32 |
| No. 8 | The same amount of disaccharide alcohol is added/the milk fat content is 10% (reduced maltose + lactose) *4 | ○ | 135.0 | 67.13 | ○ | 27.18 | 6.32 |
| No. 9 | The same amount of disaccharide alcohol is added/the milk fat content is 11% (reduced maltose + lactose) *4 | ○ | 147.5 | 66.00 | ○ | 27.92 | 6.31 |
| No. 10 | The same amount of disaccharide alcohol is added/the milk fat content is 12% (reduced maltose + lactose) *4 | ○ | 137.5 | 64.80 | ○ | 28.54 | 6.30 |
| No. 11 | The same amount of disaccharide alcohol is added/the milk fat content is 13% (reduced maltose + lactose) *4 | ○ | 210.0 | 63.90 | ○ | 28.95 | 6.29 |
| No. 12 | The same amount of disaccharide alcohol is added/the milk fat content is 14% (reduced maltose + lactose) *4 | ○ | 485.0 | 62.75 | ○ | 28.10 | 6.36 |
| No. 13 | The same amount of disaccharide alcohol is added/the milk fat content is 16% (reduced maltose + lactose) *4 | Δ | 705.0 | 59.65 | ○ | 31.01 | 6.34 |
| No. 14 | The same amount of disaccharide alcohol is added/the milk fat content is 18% (reduced maltose + lactose) *4 | Δ | 1287.5 | 57.00 | ○ | 32.43 | 6.28 |
| No. 15 | The same amount of disaccharide alcohol is added/the milk fat content is 20% (reduced maltose + lactose) *4 | X | 1520.0 | 54.93 | X Strong oily taste | 32.80 | 6.31 |

*1 visually confirmed by state of appearance
*2 viscosity of 200 cP or less is suited for use in dispenser
*3 sensory test upon drinking after dilution
*4 milk fat content is adjusted by an amount of frozen cream cheese
*5 milk protein content is adjusted by an amount of skim milk powder
Evaluation criteria ○: Good Δ: Slightly poor X: Poor
Evaluation criteria ○: Good Δ: Slightly poor X: Poor Example 4

Samples Nos. 16 to 22 were prepared by the same process and the same amounts of components as those in Example 1, except that the milk protein content was changed. Qualities of these samples were evaluated in the same manner as in Example 2. The results are shown in Table 3. Regarding samples Nos. 21 and 22, since viscosity is increased, a rotor No. 2 at 6 rpm and a rotor No. 4 at 6 rpm were respectively used in place of the rotor No. 2 at rpm.

TABLE 3

| Sample No. | Test contents | Freezing endurance *1 | Viscosity (Cp) *2 | Moisture content (%) | Taste/ Sweetness *3 | Brix | pH |
|---|---|---|---|---|---|---|---|
| No. 16 | The same amount of disaccharide alcohol is added/the milk protein content is 2% (reduced maltose → lactose) *5 | X Separation into two layers | 65.0 | 77.90 | X Short on the taste and richness | 13.52 | 6.03 |
| No. 17 | The same amount of disaccharide alcohol is added/the milk protein content is 3% (reduced maltose → lactose) *5 | ○ | 72.5 | 75.01 | ○ Slightly short on the richness | 16.97 | 6.22 |

TABLE 3-continued

| Sample No. | Test contents | Freezing endurance *1 | Viscosity (Cp) *2 | Moisture content (%) | Taste/ Sweetness *3 | Brix | pH |
|---|---|---|---|---|---|---|---|
| No. 18 | The same amount of disaccharide alcohol is added/the milk protein content is 4% (reduced maltose → lactose) *5 | ○ | 42.5 | 72.30 | ○ Slightly short on the richness | 20.62 | 6.23 |
| No. 19 | The same amount of disaccharide alcohol is added/the milk protein content is 6% (reduced maltose → lactose) *5 | ○ | 92.5 | 66.60 | ○ | 27.69 | 6.28 |
| No. 20 | The same amount of disaccharide alcohol is added/the milk protein content is 7% (reduced maltose → lactose) *5 | ○ | 380 | 70.00 | ○ | 30.98 | 6.31 |
| No. 21 | The same amount of disaccharide alcohol is added/the milk protein content is 8% (reduced maltose → lactose) *5 | Δ | 4525 | 60.70 | ○ | 34.79 | 6.32 |
| No. 22 | The same amount of disaccharide alcohol is added/the milk protein content is 10% (reduced maltose → lactose) *5 | X Separation into two layers | 35000 | 54.00 | X Powdery taste | 40.26 | 6.30 |

*1 visually confirmed by state of appearance
*2 viscosity of 200 cP or less is suited for use in dispenser
*3 sensory test upon drinking after dilution
*4 milk fat content is adjusted by an amount of frozen cream cheese
*5 milk protein content is adjusted by an amount of skim milk powder
Evaluation criteria ○: Good Δ: Slightly poor X: Poor
Evaluation criteria ○: Good Δ: Slightly poor X: Poor Example 5

Samples Nos. 23 to 33 were prepared by the same process and the same amounts of components as those in Example 1, except that the amount of the disaccharide alcohol (maltitol:lactitol=1.25:1) was changed. Qualities of these samples were evaluated in the same manner as in Example 2. The results are shown in Table 4.

TABLE 4

| Sample No. | Test contents | Freezing endurance *1 | Viscosity (Cp) *2 | Moisture content (%) | Taste/ Sweetness *3 | Brix | pH | Reduced lactose | Reduced maltose |
|---|---|---|---|---|---|---|---|---|---|
| No. 23 | The amount of disaccharide alcohol is 0% | X | 295.0 | 72.90 | X No richness | 20.39 | 6.32 | — | — |
| No. 24 | the amount of disaccharide alcohol is 1.69% | ○ | 130.0 | 70.99 | X No richness | 22.14 | 6.24 | 0.75 | 0.94 |
| No. 25 | the amount of disaccharide alcohol is 2.53% | ○ | 142.5 | 63.68 | Δ Slightly weak sweetness | 23.24 | 6.34 | 1.125 | 1.410 |
| No. 26 | the amount of disaccharide alcohol is 3.38% | ○ | 185.0 | 69.47 | Δ Slightly weak sweetness | 24.59 | 6.20 | 1.50 | 1.88 |
| No. 27 | the amount of disaccharide alcohol is 5.06% | ○ | 115.0 | 67.60 | ○ | 26.25 | 6.31 | 2.25 | 2.81 |
| No. 28 | the amount of disaccharide alcohol is 6.75% (current amount is added) | ○ | 125.0 | 66.30 | ○ | 28.47 | 6.31 | 3.00 | 3.75 |
| No. 29 | the amount of disaccharide alcohol is 8.44% | ○ | 155.0 | 64.66 | ○ | 29.75 | 6.24 | 3.75 | 4.69 |
| No. 30 | the amount of disaccharide alcohol is 10.03% | ○ | 180.0 | 62.38 | ○ | 31.54 | 6.26 | 4.50 | 5.63 |
| No. 31 | the amount of disaccharide alcohol is 11.81% | ○ | 150.0 | 60.90 | ○ | 28.15 | 6.39 | 5.25 | 6.56 |
| No. 32 | the amount of disaccharide alcohol is 13.50% | ○ | 160.0 | 59.20 | ○ | 32.01 | 6.40 | 6.00 | 7.50 |
| No. 33 | the amount of disaccharide alcohol is 15.19% | ○ | 177.5 | 62.18 | X Too sweet | 32.05 | 6.22 | 6.75 | 8.44 |

*1 visually confirmed by state of appearance
*2 viscosity of 200 cP or less is suited for use in dispenser
*3 sensory test upon drinking after dilution
*4 milk fat content is adjusted by an amount of frozen cream cheese
*5 milk protein content is adjusted by an amount of skim milk powder
Evaluation criteria ○: Good Δ: Slightly poor X: Poor
Evaluation criteria ○: Good Δ: Slightly poor X: Poor In Tables 2 to 4, in the same manner as in Example 1, symbols ○, Δ and x denote "Good (○)", "Slightly Poor (Δ)" and "Poor (x)", respectively. The evaluation results of compositions of samples shown in Tables 2 to 4 revealed the following facts. Namely, in the sample No. 2 in which a conventional sucrose instead of the disaccharide alcohol was added, it cannot be used as a whitener for coffee, tea and cocoa because of considerably sweet taste even if the amount of the sugar is only about 6.75%. In addition, even if the amount of the disaccharide alcohol is maintained at 6.75%, when the milk fat content is low or high, there arises a problem in freezing endurance. When the milk fat content is high, viscosity also increases. It was also confirmed that there arises problems in both viscosity and freezing endurance when the milk protein content is a low level of 2% or less and is a high level of 8% or more. Further although data are not shown, when the content of the disaccharide alcohol increases, freezing endurance is improved. With the increase of the content of the disaccharide alcohol, however, viscosity tends to increase. When only maltitol is used as the disaccharide alcohol and the content is 15% by weight based on the total amount, viscosity exceeds 200 cP and the resultant product is not suited for use in a dispenser. However it was found that an increase in viscosity could be suppressed by using a mixture of maltitol and lactitol in a mixing ratio of 1.25:1.

INDUSTRIAL APPLICABILITY

By preparing an emulsified composition containing a milk fat content, a milk protein content, a disaccharide alcohol and an emulsifier in a certain ratio, a dairy product having both characteristics of freezing endurance and low viscosity is obtained, and the resultant dairy product can be preferably applied to a dispenser and also can be stored for a long period.

The invention claimed is:

1. A dairy product comprising 5.5 to 12.0% by weight of a milk fat content, 3 to 7.5% by weight of a milk protein, 2.5 to 14% by weight of a disaccharide alcohol and 0.1 to 2% by weight of an emulsifier, and having viscosity of 200 cP or less;
    wherein the disaccharide alcohol is a combination of maltitol and lactitol in a weight ratio of 1.25:1, and
    wherein neither solidification nor separation of components is observed and a homogeneous condition is maintained even after freezing and thawing.

2. The dairy product according to claim 1, wherein the milk protein comprises sodium caseinate.

3. The dairy product according to claim 1, wherein the dairy product contains metaphosphoric acid and the emulsifier, and wherein the emulsifier is a mixture of sugar ester and glycerin fatty acid ester.

4. A method for producing the dairy product according to claim 1, comprising the steps of:
    mixing 5.5 to 12.0% by weight of a milk fat content, 3 to 7.5% by weight of a milk protein, 2.5 to 14% by weight of a disaccharide alcohol and 0.1 to 2% by weight of an emulsifier, and
    homogenizing the resultant mixture.

5. The dairy product according to claim 2, wherein the dairy product contains metaphosphoric acid and the emulsifier, and wherein the emulsifier is a mixture of sugar ester and glycerin fatty acid ester.

6. The dairy product of claim 1, comprising 5.5 to 11.0% by weight of a milk fat content.

* * * * *